US 6,631,051 B2

(12) United States Patent
Watanabe et al.

(10) Patent No.: US 6,631,051 B2
(45) Date of Patent: Oct. 7, 2003

(54) MAGNETIC HEAD INCLUDING A SLIDER WITH A HOLE, A MAGNETIC HEAD CORE HAVING A MAGNETIC GAP, AND A WINDING WOUND AROUND THE MAGNETIC HEAD CORE

(75) Inventors: Hitoshi Watanabe, Tokyo (JP); Hiroshi Nishizawa, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 212 days.

(21) Appl. No.: 09/789,766

(22) Filed: Feb. 22, 2001

(65) Prior Publication Data

US 2001/0017747 A1 Aug. 30, 2001

(30) Foreign Application Priority Data

Feb. 28, 2000 (JP) ........................... 2000-052407

(51) Int. Cl.⁷ .............................................. G11B 5/147
(52) U.S. Cl. ....................................... 360/126; 360/234.9
(58) Field of Search ................................. 360/123, 126, 360/234.9

(56) References Cited

U.S. PATENT DOCUMENTS 3,553,389 A * 1/1971 Barger .................. 360/123
5,008,767 A * 4/1991 Iwata ................... 360/234.9
5,157,567 A * 10/1992 Zak .................... 360/234.9
5,590,008 A * 12/1996 Tanabe ................. 360/126

FOREIGN PATENT DOCUMENTS

| JP | 11-149614 | 6/1999 |
| JP | 11-224405 | 8/1999 |
| JP | 11-238292 | 8/1999 |

* cited by examiner

*Primary Examiner*—A. J. Heinz
(74) *Attorney, Agent, or Firm*—McDermott, Will & Emery

(57) ABSTRACT

A winding is wound directly on the magnetic head core formed of a single crystal of Mn—Zn ferrite. The diameter is 20–30 μm. A high-saturated magnetic flux density material (iron) having a magnetic flux density which is more than 1.3 T covers walls of the magnetic gap using sputtering. A slider including the magnetic head comprises ceramic including titanium calcium. The magnetic head is adhered to the slider with a low melting point glass. In a magnetic recording apparatus including the above-mentioned magnetic head, the slider includes air bearing surface trains arranged in the driving direction of the magnetic recording medium on a contact surface of the slider. Each bearing surface train includes protruding portions and a hollow portion direction. The hollow portion escapes the air between the protruding portion and the recording medium. The head is evacuated from the magnetic recording medium.

20 Claims, 6 Drawing Sheets

INSERTING DIRECTION ↑

MAGNETIC HEAD INCLUDING A SLIDER WITH A HOLE, A MAGNETIC HEAD CORE HAVING A MAGNETIC GAP, AND A WINDING WOUND AROUND THE MAGNETIC HEAD CORE

BACKGROUND OF THE INVENTION

1. Field of the Invention

This invention relates to a magnetic head for recording and reading data on and from a recording medium, a method of producing the magnetic head, and a magnetic recording apparatus having a magnetic head for recording and reading data on and from a recording medium.

2. Description of the Prior Art

Magnetic heads having a core and a coil and magnetic recording apparatuses including the magnetic head are known. The coil of the magnetic head is formed as follows:

An annealed copper wire is wound around a coil bobbin and then, the bobbin is attached to the magnetic head.

SUMMARY OF THE INVENTION

The aim of the present invention is to provide a superior magnetic head, a superior method of producing the same and a superior magnetic recording apparatus.

According to the present invention, a first aspect of the present invention provides a magnetic head comprising: a slider having a hole; a magnetic head core having a magnetic gap, the magnetic head core being arranged in the hole such that the magnetic gap is exposed to the outside of the slider; and a winding wound around the magnetic head core, wherein the winding is directly wound on the magnetic head core.

Preferably, a diameter of the winding is from 20 to 30 $\mu$m.

Preferably, the magnetic head core is formed of a single crystal of Mn—Zn ferrite.

Preferably, a high-saturated magnetic flux density material having a saturated magnetic flux density which is more than 1.3 T covers either of walls of the magnetic gap. In this case, the high-saturated magnetic flux density material may comprise iron.

Preferably, the slider comprising ceramic includes titanium calcium.

Preferably, the magnetic head further comprises low melting point glass for adhering the magnetic head core to the slider.

According to the present invention, a second aspect of the present invention provides a magnetic recording apparatus comprising: driving means for driving a magnetic recording medium; a head assembly including first and second magnetic heads pinching the magnetic recording medium. At least one of the magnetic heads comprises: a slider having a hole; a magnetic head core having a magnetic gap, the magnetic head core being arranged in the hole such that the magnetic gap is exposed to the outside of the slider; and a winding wound around the magnetic head core. The winding is directly wound on the magnetic head core.

Preferably, the slider includes a plurality of air bearing surface trains arranged in the direction of driving the magnetic recording medium on a contact surface of the slider, each air bearing surface train including protruding portions and a hollow portion between the protruding portions in the direction of driving the magnetic recording medium, the hollow portion escaping the air between the protruding portion and the recording medium therethrough.

Preferably, the magnetic recording apparatus further comprises head shifting means for shifting the head assembly in a predetermined radial direction of the magnetic recording medium, wherein the magnetic heads evacuates from the magnetic recording medium with the head shifting means.

According to the present invention, a third aspect of the present invention provides a method of producing a magnetic head comprising the steps of: providing first and second magnetic head cores having predetermined forms to provide a magnetic circuit with a gap therebetween when the first magnetic head core is connected to the second magnetic head core; sputtering a high saturated magnetic flux density material on a surface (wall) of at least one of the first and second magnetic head cores; and connecting the first and second magnetic head cores.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinbelow will be described an embodiment of this invention.

Figure 1:
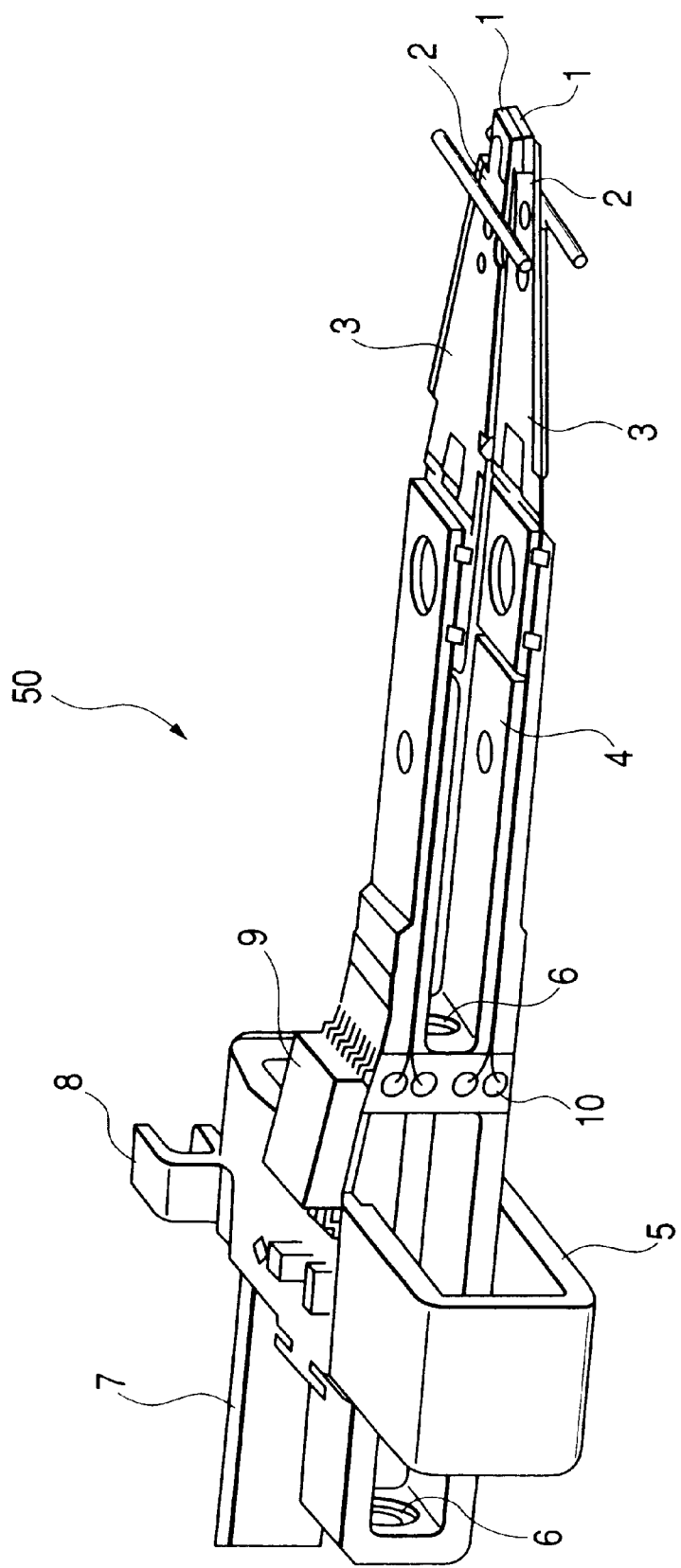
FIG. 1 is a perspective view of a head stack assembly according to an embodiment of the present invention.

FIG. 1 is a perspective view of a head stack assembly according to an embodiment of the present invention.

The head stack assembly 50 includes magnetic heads 1 which pinch a magnetic recording medium having flexibility during recording and reading.

In this embodiment, as the magnetic recording medium, a floppy disk is used. The floppy disk (cookie) is rotatably contained in a cartridge (shell). A carriage 4 supports suspensions 3. The suspensions 3 supports gimbal springs 2. The gimbal springs 2 support the magnetic heads 1 with degree of freedom in the rolling and pitching directions. The magnetic heads 1 pinch the floppy disk when the cartridge is set on a spindle shaft 32. In other words, the suspensions 3 pinch both surfaces of the floppy disk with the magnetic heads 1 at a predetermined load. The gimbal springs 2 and the suspensions 3 are made of non-magnetic stainless steel plates (SUS304) for example. The suspensions 3 are supported by the carriage 4 through hinges which are provided by swaging. The swaging is such that an inside diameter of a hole is expanded by inserting a steel ball or the like. The carriage 4 is provided by mechanically processing an extrusion material of aluminum to have a predetermined shape and heat-treating it. Moreover, the carriage 4 may be subjected to the phosphoric acid film process or other passive state process.

A voice coil 5 is fixed to the carriage 4 and generates a driving force to the carriage 4 in the radial direction of the floppy disk to provide track seeking in response to a driving signal from a control circuit 62. Metals 6 are provided to the carriage 4 to accurately shift the carriage 4 along a guide rod (not shown) by the driving force generated in the voice coil motor 36 in the radial direction of the floppy disk. The guide rod is provided with a rod, having a diameter of φ1 mm (SUS 440C). The metal 6 is made of ceramic of zirconia. The axial span between the metals 6 and the gap between the metal 6 and the guide rod are determined in consideration of the sliding load and the allowable looseness. The guide rod is coated with a small amount of silicon oil having a superior thermal characteristic to smoothly shift the carriage 4. A flexible printed circuit cable 7 provides interconnection between the control circuit 62 and the head amplifier 9 and other circuits on the upper surface of the carriage 4. The flexible printed circuit 7 includes a Polymide base film having a thickness of ½ Mil and conductors at a cable portion. Further, the head amplifier 9 and other circuits are provided by reflow-soldering on the base film above the carriage 4. Thus, the head amplifier 9 is arranged near the heads 1 to surely amplify weak reproduced signals from the magnetic heads 1. Moreover, the writing signals are supplied to the magnetic heads 1 via junction points 10. The outrigger 8 prevents the carriage 4 from rotating around the guide rode when the carriage 4 shifts in the radial direction of the floppy disk.

Figure 2:
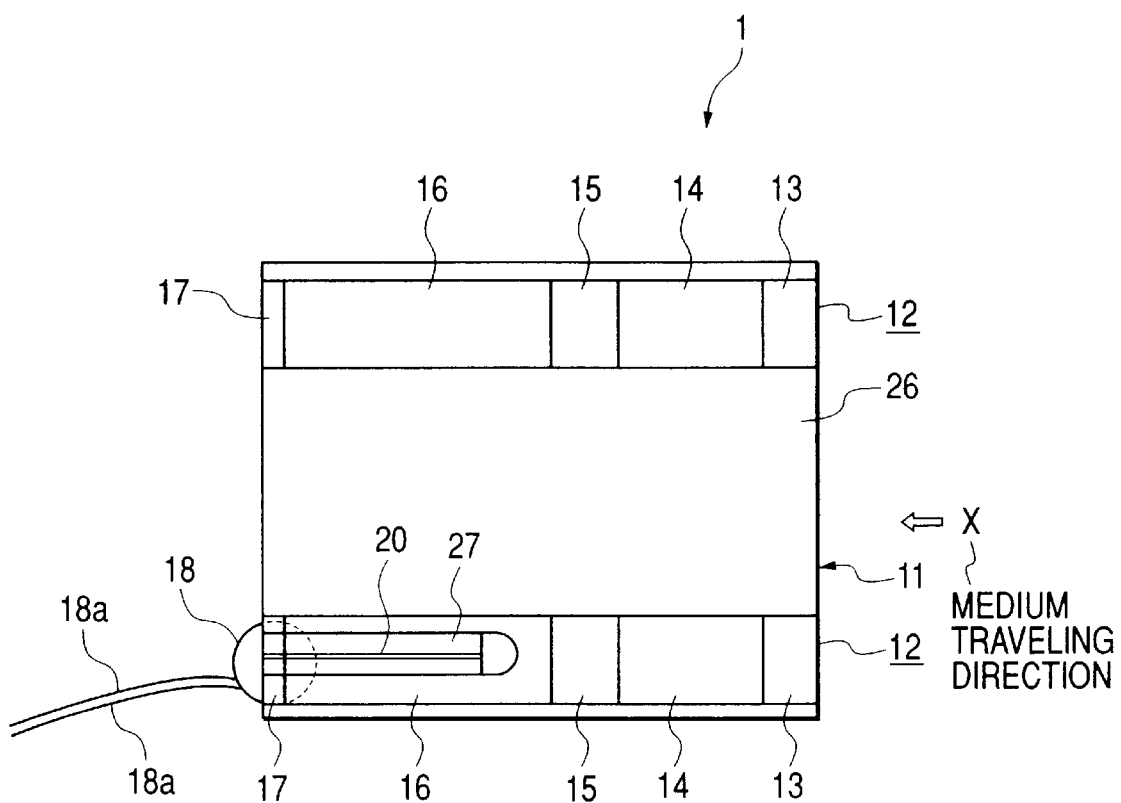
FIG. 2 is a plan view of the magnetic head shown in FIG. 1 wherein the contacting surface with the floppy disk is shown.
Figure 3:
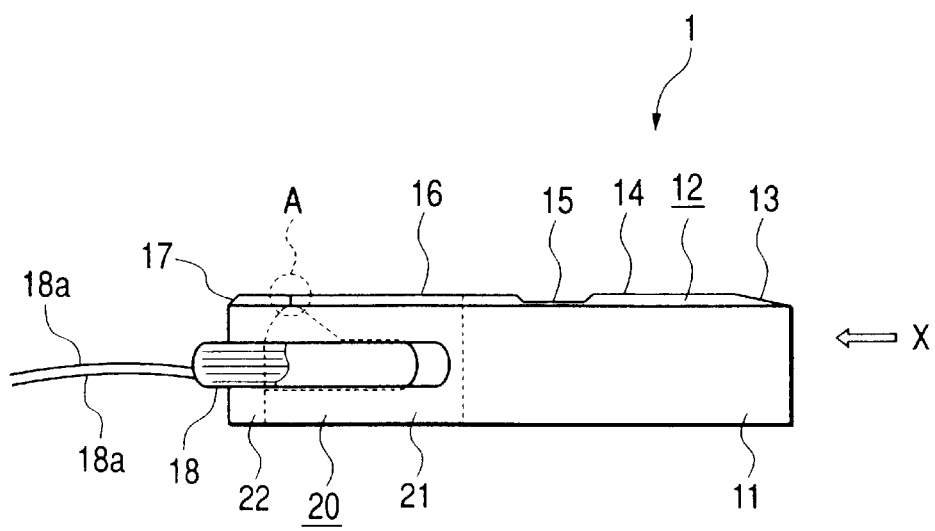
FIG. 3 is a side view of the magnetic head shown in FIG. 2.
Figure 4:
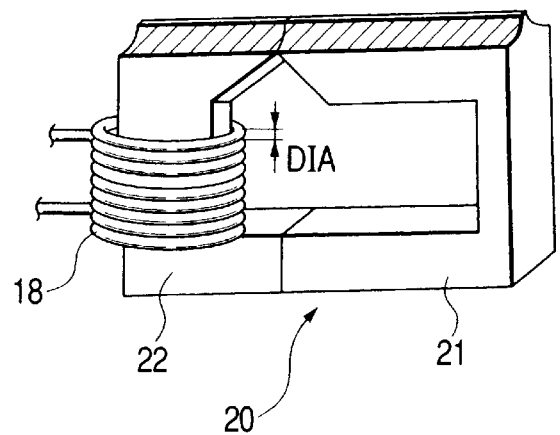
FIG. 4 is a perspective view of the magnetic head core and a coil of the magnetic head shown in FIG. 2.
Figure 5:
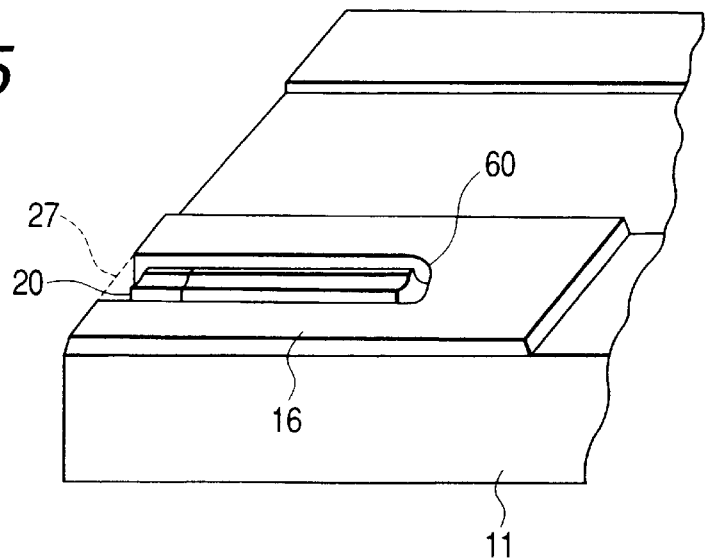
FIG. 5 is a perspective view of the magnetic head core and the slider according to the embodiment.

FIG. 2 is a plan view of the magnetic head 1 shown in FIG. 1, wherein the contacting surface with the floppy disk is shown. FIG. 3 is a side of the magnetic head 1. FIG. 4 is a perspective view of the magnetic head core 20 and a magnetic head coil 18 of the magnetic head shown in FIG. 1. FIG. 5 is a perspective view of the magnetic head core 20 and the slider 11.

In FIGS. 2 and 3, the slider 11 is made of a ceramic mainly including titanium calcium. On the surface contacting with the magnetic recording medium, air bearing surfaces (trains) 12 are provided at the both sides of a flat portion 26 in the traveling direction X of the magnetic recording medium (the predetermined tangent direction of the magnetic recording medium). More specifically, the air bearing surfaces 12 are arranged in the radial direction of the floppy disk on both sides of the slider. Each air bearing surface train 12 is directed in the predetermined tangent direction of the floppy disk.

The air bearing surface has a front slope portion 13, a front flat portion 14, a crosscut portion 15, a rear flat portion 16, and a rear slope 17 and these are arranged in the traveling direction X in order of mention. In other words, the air bearing surface 12 includes a first protruding portion having the front slope 13 and the front flat portion 14, a groove (hollow portion) corresponding to the crosscut portion 15, and a second protruding portion having the rear flat portion 16 and the rear slope 17. The crosscut portion (the direction of the groove) 15 is arranged perpendicularly to the traveling direction X (the arrangement direction of the air bearing surface) and provided to each air bearing surface 12.

The slider 11 has a width of 1.6 mm and a length of 2.0 mm and is referred to as a 50%-nano-slider. The width of the air bearing surface 12 is 0.3 mm. The crosscut portion 15 is formed about 0.5 mm distance from the tip of the front slope 13 with a width of about 0.5 mm (the width of the groove is about 0.5 mm). These dimensions are varied in accordance with the material of the recording medium, the rotation speed, the pressure load of the magnetic heads, and other conditions.

The magnetic head core 20 includes a C-shaped core 21 and an I-shaped core 22 to provide a magnetic circuit including a gap 25. The magnetic head core 20 is inserted in a groove (hole) 60 in the second protruding portion and adhered to the slider 11 and is sealed with a low melting point glass 27 as shown in FIGS. 2 and 5, wherein the top surface of the magnetic head core 20 is aligned with the surface of the second protruding surface 16 as shown in FIGS. 3 and 5. Moreover, the top surface of the low melting point glass 27 is substantially aligned with the surface of the second protruding surface 16. Then, a magnet wire is wound around the I-shaped core 22 as the magnetic head coil 18, wherein the magnetic wire is directly wound on the surfaces of the I-shaped core 22 as shown in FIG. 3.

As the low melting point glass 27, a glass material having a melting point lower than 400° C. (a material having a glass transition point of 316° C. and a softening point of 365° C.) is used. More specifically, in this embodiment, borosilicate lead glass (glass transition point is from 310 to 320° C.) is used. The magnetic head core 20 is formed by cutting a single crystal Mn—Zn ferrite in the predetermined crystal orientation. Further, cutting is performed in consideration of the characteristic varying in accordance with the crystal orientation. The magnetic head coil 18 that is derived by directly winding on the magnetic head core 20 has leads 18a connected to the junction points 10 to couple the magnetic head coil 18 to the electronic circuits such as the head amplifier 9 on the flexible printed circuit 7.

Figure 6:
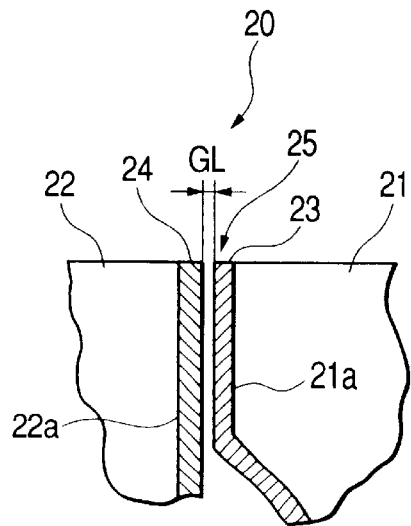
FIG. 6 is a partial enlarged cross-sectional view of the magnetic head at the portion indicated by ""A"" in FIG. 3.

FIG. 6 is a partial enlarged cross-sectional view of the magnetic head 1 at the portion indicated by "A" in FIG. 3.

The C-shaped core 21 and the I-shaped core 22 are made to have predetermined crystal orientations as mentioned above. Moreover, the C-shaped core 21 and the I-shaped core 22 are coated with metal thin films 23 and 24 made of a Hi-B material (high saturated magnetic flux density material) having a saturated magnetic flux density more than 1.3 T by sputtering, respectively. Thus, the walls 21a and 22a of the gap 25 are covered with the Hi-B material 23 and 24. It is sufficient that the saturated magnetic flux density of the Hi-B material is more than 1.3 T. Preferably, the saturated magnetic density of the Hi-B material is from 1.6 to 1.8 T. In this embodiment, the magnetic head 1 is formed in the Double-Metal-in-gap type, that is, the Hi-B material is formed on both the C-shaped core 21 and the I-shaped core 22, wherein the thickness of the films 23 and 24 is about 4 μm. Alternatively, the Hi-B material is formed on either of walls 21a or 22a of the C-shaped core 21 and the I-shaped core 22. This is selected in accordance with the characteristic of the magnetic head 1. The Hi-B material is mainly includes iron. More specifically, a single layer nitriding film of Fe—Ta—N or a pair of films including nitriding and non-nitriding layers of Fe-(Nb, Zr, Ta).

The Hi-B material in the gap 25 prevents occurrence of magnetic saturation in the gap 25. Further, the Hi-B material can improve the characteristic of the magnetic head 1 more than the Sendust alloy or amorphous alloy at a low cost. The length GL of the gap 25 is about 0.40 to 0.45 μm. The length GL of the gap 25 is determined in accordance with the gap loss, an overwriting characteristic, and other characteristics of the magnetic heads 1.

As mentioned, cores 21 and 22 have predetermined forms to provide a magnetic circuit with a magnetic gap therebetween when said first magnetic head core is connected to the second magnetic head core. The provided cores 21 and 22 are subjected to sputtering process. That is, a high-saturated magnetic flux density material is sputtered on a surface of at least one of the cores 21 and 22 which provides the gap 25. The sputtered core 21 is connected to the core 22.

As the magnetic head coil 18, a magnetic wire including silver of about 2 wt % (percent by weight) as additive agent is used. The diameter DIA of the magnetic wire is about 25 μm. The magnetic wire is wound around the I-shaped core 22 directly on the surfaces of the I-shaped core. It is better that the diameter DIA of the magnetic wire is small to reduce the space occupied by the magnetic wire. If the diameter DIA of the magnetic wire exceeds 30 μm, for example, 35 μm, the magnetic head coil 18 protrudes from the slider 11 because the thickness of the slider 11 is limited due to miniaturization of the magnetic head 1. Moreover, the magnetic head 1 cannot suitably contact with the magnetic recording medium because a gap is developed between the magnetic head 1 and the magnetic recording medium due to unbalanced weight of the slider 11 with respect to the traveling direction. Preferably, the diameter DIA of the magnet wire is from 20 to 30 μm.

If the diameter DIA of the magnetic wire is 25 μm, the tensile strength is about 14 gf and the tensile force developing almost no extension is about 7 to 8 gf. Thus, the winding process requires a careful operation. The tensile strength and the safety tensile force are approximately proportional to a square of the diameter DIA. Generally, the smaller the diameter DIA of the magnetic wire, the more winding operation time and thus, the small diameter DIA decreases the yield.

Figure 7:
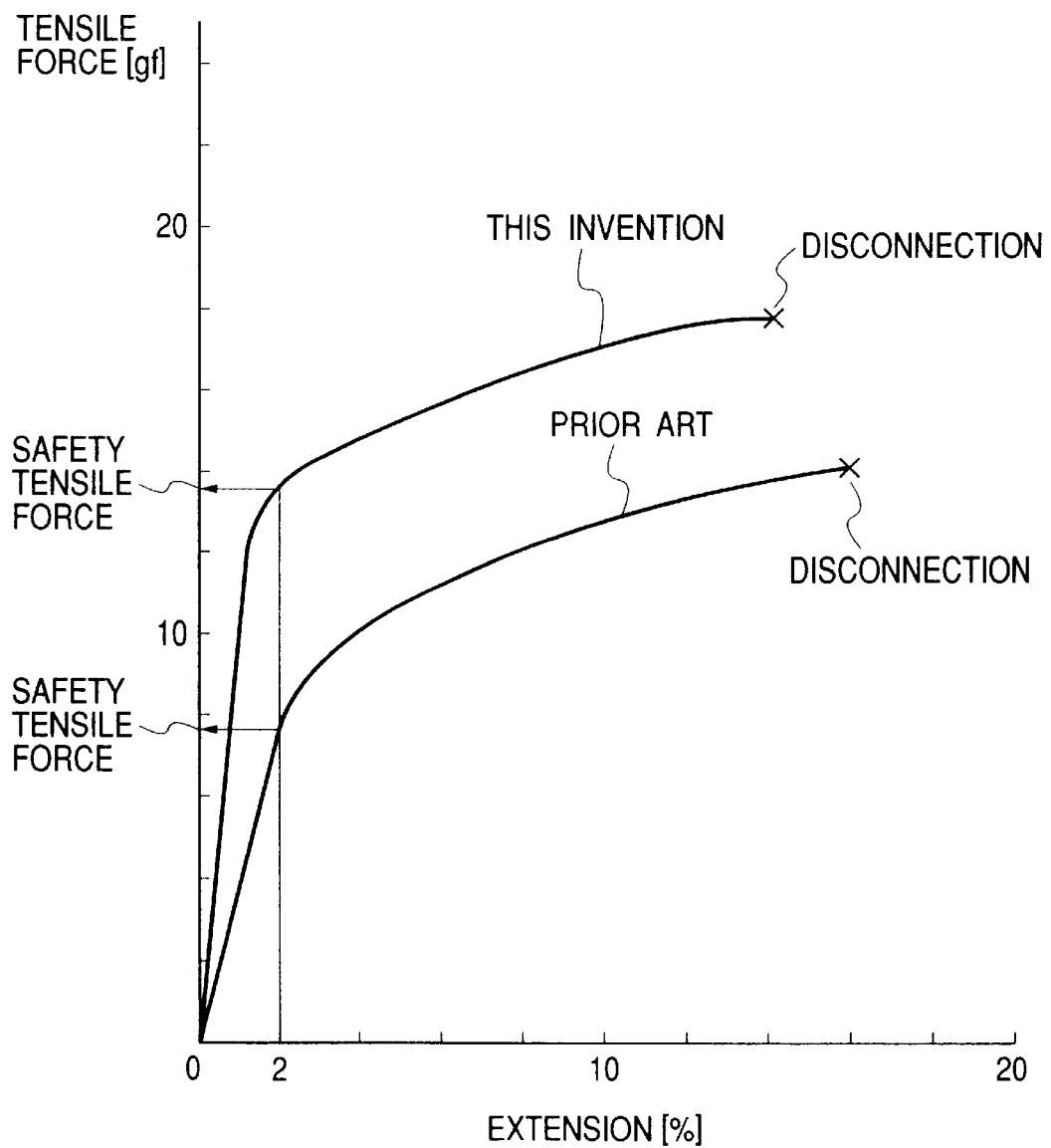
FIG. 7 is a graphical drawing illustrating extension with respect to the tensile force of this invention and that of a prior art.

Moreover, it is well known that the defective magnetic heads are mainly caused by disconnection of the magnetic wire. FIG. 7 is a graphical drawing illustrating variation of the tensile force with respect to extension in the magnet wires between this invention and the prior art.

In this embodiment, the tensile force corresponding to extension of 2% is defined as the safety tensile force. Thus, the winding operation is performed with a tensile force less than that corresponding to extension 2%.

As shown in FIG. 7, the safety tensile force (corresponding to extension of 2%) of the magnetic wire including silver of 2 wt % is about 13 gf which is about 1.7 times that of the magnet wire of the prior art. Thus, using the magnetic wire including silver of 2 wt % improves the efficiency in the winding operation. Thus, the yield has been improved. The range of adding silver for the magnetic wire is from 1.5 to 2.5 wt % and such a magnetic wire provides the same result. Moreover, the tensile strength is improved, so the tensile force at disconnection is also increased.

Materials of the magnetic head core 20, the slider 11, and the low melting point glass 27 and the relation therebetween will be described. The material of the slider 11 has a wear resistance which is sufficiently higher than that of the magnetic recording medium. The shape of the slider 11 is determined in consideration of workability in lapping with the abrasive material or with a lapping tape in addition to other basic designing points. Moreover, the important requirement for the slider 11 is that the thermal expansion coefficient is near that of the magnetic head core 20. As the material of the magnetic head core 20, Mn—Zn ferrite having a low specific resistance is used. This material has been selected in consideration of the face that the magnetic head core 20 relatively moves to the magnetic recording medium with contact thereto. That is, static electricity is developed at the surfaces of the magnetic recording medium due to friction with the air during rotation. The magnetic head core 20 having a low specific resistance discharges the electrostatic electricity. This suppresses noise due to discharge of high electrostatic charges, so that error is prevented. On the other hand, if Ni—Zn ferrite is used due to a high frequency characteristic, discharging will occur because it has a high specific resistance. Thus, this material is not used in this embodiment to prevent electrostatic discharging. Accordingly, in this embodiment titanium calcium is used for the slider 11 because its thermal expansion coefficient is almost the same as that of the Mn—Zn ferrite used for the magnetic head core 20.

Moreover, as the low melting point glass 27 for adhering and sealing, the material of which thermal expansion coefficient is near that of the magnetic head core 20 is used. Moreover, because in a single crystal of ferrite, internal stresses are complicatedly distributed due to stress by the adhering and sealing, there is variation in the magnetic characteristic (magnetic permeability) in accordance with the distribution. Thus, borosilicate lead glass (glass transition point: 310–320° C.) is used as the low melting point glass. Moreover, because the magnetic head core 20 wears due to friction with the magnetic recording medium, a ceramic having a high wear resistance is formed around the magnetic head core 20 to increase the wear resistance.

Next, the diameter DIA and the winding operation of the magnetic wire for the magnetic head coil 18 will be further described.

Extension in the magnetic wire at the same tensile force is approximately inversely proportional to its cross section as mentioned above. Thus, the safety tensile force is proportional to the cross section, that is, the safety tensile force is proportional to square of the diameter DIA. That is, the safety tensile force is about 1.7 times that of the magnetic wire of the prior art. Accordingly, in the winding operation, the magnet wire having the diameter DIA of 20 μm including silver of 2 wt % provides the sufficient working condition. Moreover, the amount of the added silver is 1.5 to 2.5 wt % which is very low, so that this does not increase in the cost. Further, addition of silver does not influence to the characteristic of the magnetic and the soldering operation. As mentioned above, the diameter DIA of the magnet wire for the magnetic head coil 18 can be made thinner in the range from 20 to 30 μm with the above-mentioned material.

Figure 8:
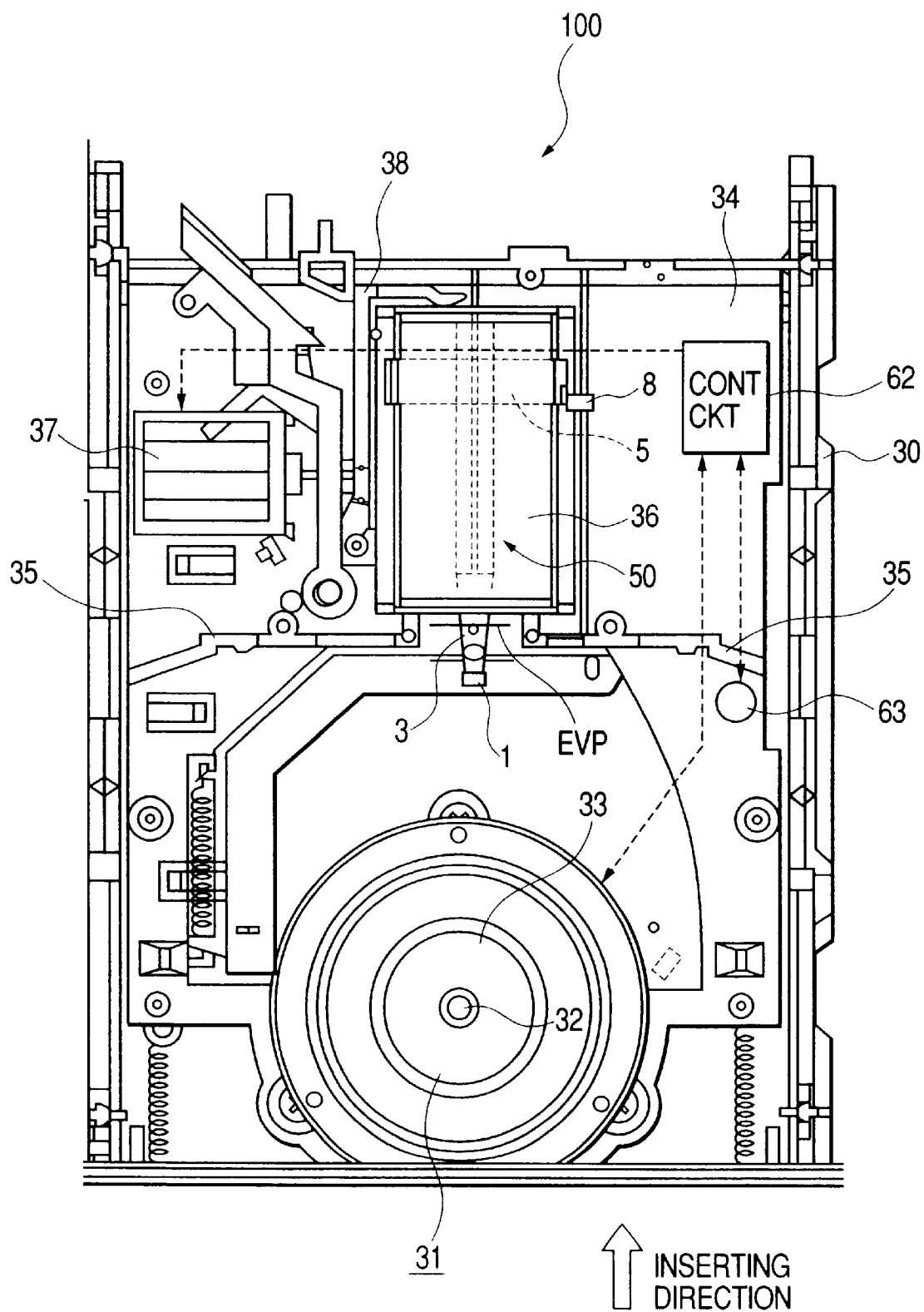
FIG. 8 is a plan view of the main portion of the magnetic recording apparatus according to this embodiment.
Figure 9:
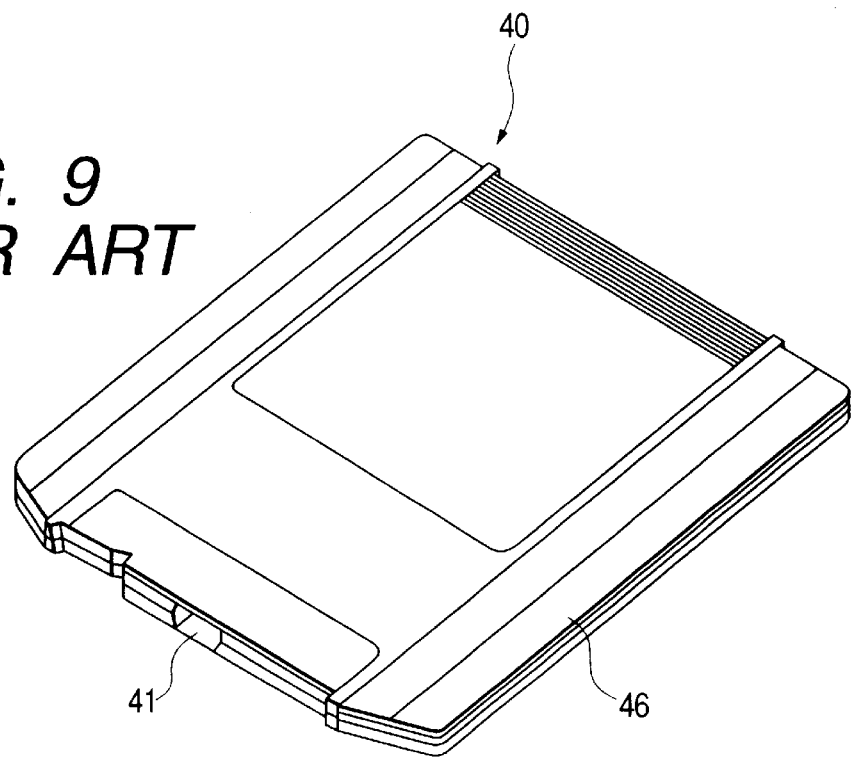
FIG. 9 is a perspective view of a floppy disk of a prior art.
Figure 10:
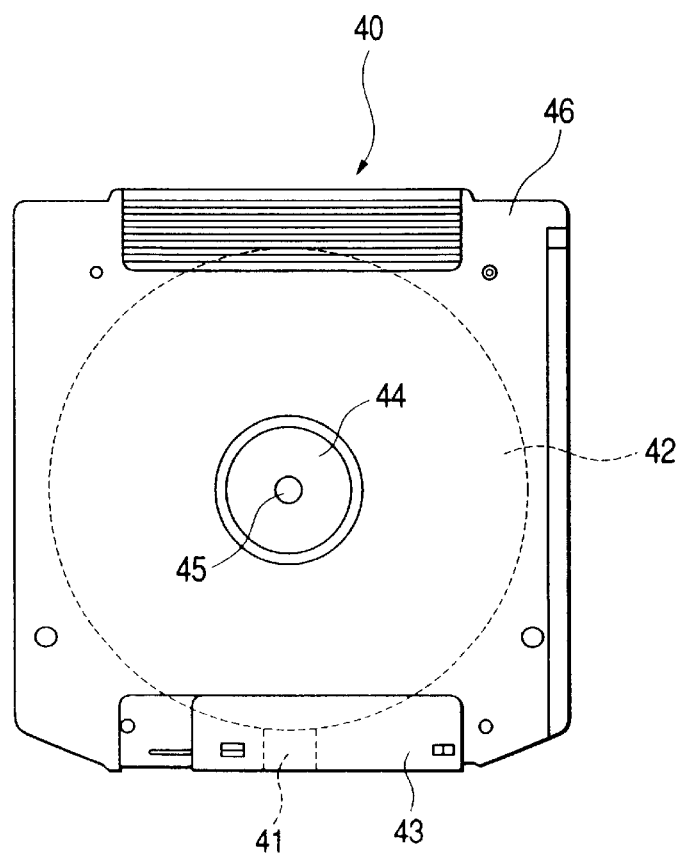
FIG. 10 is a bottom view of the floppy disk of the prior art.

The operation of the magnetic recording apparatus according to this embodiment will be described. FIG. 8 is a plan view of the main portion of the magnetic recording apparatus according to this embodiment. FIG. 9 is a perspective view of a floppy disk 40. FIG. 10 is a bottom view of the floppy disk 40.

The floppy disk 40 includes a disk of magnetic recording medium (cookie). The magnetic recording apparatus 100 including the magnetic head as mentioned above is a floppy disk drive unit. In FIG. 8, a base plate 30 is made of a cold rolled steel plate having a thickness of 1 mm and pressed to have the predetermined shape. A spindle motor 31 rotates the magnetic recording medium at about 3000 rpm. The spindle shaft 32 is fitted into a positioning hole 45 in the hub 44 of the floppy disk 40. A magnet 33 attracts the hub 44 to surly set the hub 44 on the magnet 33 to drive the magnetic recording medium. A platform 34 is made of a plastic of which strength is increased by adding glass beads or the like to polycarbonate. On the platform 34, the spindle motor 31, the head stack assembly 50, the voice coil motor 36, and other parts are assembled. For example, the control circuit 62 is provided on the platform 34.

In the voice coil motor 36, magnets are provided above and under a coil 5 to have a magnetic circuit. The driving current from the control circuit 62 for the coil 5 provides a driving force along the track arrangement direction (a radial direction of the recording medium) to position the magnetic heads 1 on the desired tracks.

On the platform 34, a wall 35 is provided as a stopper of the floppy disk 40. When the floppy disk 40 is inserted in the inserting direction, the front side of the floppy disk 40 comes to the wall 35. When the floppy disk 40 is further inserted, the whole of the platform 34 shifts upwardly, so that the floppy disk 40 is set on the magnetic recording drive unit 100. Then, the spindle motor 31 begins to rotate. The control circuit 62 detects the rotation speed of the spindle motor 31. Before the spindle motor 31 reaches to the constant predetermined rotation speed for recording and reproducing, a solenoid 37 and a latch lever 38 prevent the head stack assembly from downwardly shifting under the control by the control circuit 62 to avoid contacting of the magnetic heads 1 with the magnetic recording medium 42.

In FIG. 9, the shell 46 of the floppy disk 40 is made of a plastic having an opening 41 to provide accessing by the magnetic heads 1 at the tip of the head stack assembly 50.

In FIG. 10, the magnetic recording medium 42 has a thin flexible film made of polyethylene terephthalate (PET) and fine grains of pure iron coated on the both sides of the thin flexible film. A shutter 43 having a shutter window is provided at the opening 41 to cover the opening 41 when the floppy disk is not inserted and shifted to provide access by the magnetic heads 1 to the recording medium through the shutter window and the opening 41.

The hub 44 is made of magnetic stainless steel and is fixed to the magnetic recording medium and contained in the shell 46. The positioning hole 45 at the center of the hub 44 is fitted into the spindle shaft 32 to position the recording medium.

The load in pinching both sides of the magnetic recording medium 42 by the magnetic heads 1 is developed by the suspension 3 of the head stack assembly 50. In this embodiment, the magnetic heads 1 pinch the magnetic recording medium 42 at a load of about 4 gf which is very low. This load provides a stable contact with the minimum friction. The magnetic recording medium 42 rotates with slight waves due to un-flatness of the hub 44 or inclination of the spindle motor 31. Thus, when the magnetic head 1 contacts with the rotating magnetic recording medium 42, the magnetic recording medium vibrates in the rolling and vertical directions. These vibrations prevent the stable contact between the magnetic heads 1 and the magnetic recording medium 42 and prevent stress for the magnetic head coils 18. In this embodiment, the magnetic wire is directly wound around the magnetic head core 20 but edges at the magnetic head core do not disconnect the magnetic wire because of addition of silver. Moreover, the material of the lead 18a is the same as the magnetic head coil 18, so that the lead 18a is not easily disconnected. That is, silver is added for the magnetic wire, so the disconnection strength is improved. Thus, there is almost no disconnection of the magnetic head coil 18.

The rotation speed of the magnetic recording medium 42 is 3000 rpm which is high, so air flow from the center of the hub 44 toward the peripheral of the magnetic recording medium 42 in the shell 46 is developed because of the difference between the speed at respective portions in the rotating direction and the air having viscosity with the magnetic recording medium above the respective portions. In addition, another air flow is developed in the rotation direction of the magnetic recording medium 42. This air flow reduces the load of the magnetic head 1 by the front slope 13 and the front flat portion 14. According to conditions, the slider flies, that is, the gap 25 of the magnetic head core 20 is detached from the magnetic recording medium 42. Then, the crosscut portion (hollow portion) 15 provided at the air bearing surface (ABS) 12 escapes the air flow in the direction perpendicular to the moving direction of the magnetic recording medium 42 to prevent occurrence of the positive pressure to provide stable contact of the magnetic head core 20 with the magnetic recording medium 42.

When the spindle motor 31 does not reach the predetermined rotation speed, the latch lever 38 prevents contact between the magnetic recording medium 42 and the magnetic head 1. Moreover, when the spindle motor 31 does not reach the predetermined rotation speed, the head stack assembly 50 evacuates from the magnetic recording medium region to the evacuation position EVP. Thus, the spindle motor 31 is started up in the condition that the magnetic heads 1 are detached from the magnetic recording medium 42. Thus, the starting up torque of the spindle motor 31 can be reduced. This results in miniaturizing the floppy disk drive unit, reduces the cost and saves the power.

More specifically, when the floppy disk is not set and the rotating speed is lower than the predetermined rotation speed, i.e., in a standby condition, the control circuit 62 shifts the head stack assembly 50 to the evacuation position EVP.

The above-mentioned embodiment has been described in the case that the magnetic recording apparatus is a floppy disk drive. However, this invention is applicable to other magnetic recording or reproducing apparatus.

As mentioned above, the tensile strength of the magnetic coil is improved, so that the diameter DIA of the magnetic head coil 18 can be reduced. Thus, the size of the magnetic head coil 18 can be reduced and the size of the magnetic circuit can be reduced. Moreover, the weight of the magnetic core is reduced. The core is made of the single crystal of Mn—Zn ferrite, so that a high frequency characteristic is provided, wherein static discharge is prevented because its specific resistance is low.

The gap of the magnetic head core is coated with the high-saturated magnetic flux density material to prevent magnetic saturation in the gap. Thus, a suitable recording is provided even for the magnetic recording medium having a high coercive force for high-density recording. For the high-saturated magnetic flux density material, iron is used, so that the cost is reduced.

In this embodiment, the high-saturated magnetic flux density material is coated on the cores 21 and 22, so that the bond strength is higher than that in the case of the deposited film. Thus, the yield can be improved.

Moreover, in the magnetic head according to this embodiment, the slider 11 is made of ceramics mainly including titanium calcium. Thus, the thermal expansion coefficient of the slider 11 can be equalized to that of the core in the magnetic head 1. Thus, the stress to the magnetic head core 20 can be reduced.

In this embodiment, the magnetic head core 20 is adhered to the slider 11 and sealed with a low melting point glass 27 having a melting point lower than 400° C., so that the stress between the magnetic head core 20 and the slider 11 during adhering at the melting temperature can be reduced. In addition, the low melting point glass prevents absorption of humidity.

In the magnetic recording apparatus including the above-mentioned magnetic head 1, the magnetic head coil 18 in the magnetic head 1 is not easily disconnected by vibration of the magnetic head 1 during recording and reproducing because the magnetic wire includes silver of 2 wt %.

In the magnetic recording apparatus according to this embodiment, a plurality of air bearing surface trains are provided. In the air bearing surface, the crosscut portion 15 escapes the air to prevent the positive air pressure. Thus, a stable contact of the magnetic head 1 with the magnetic recording medium is provided with a low pressure load to the magnetic recording medium by the magnetic heads 1.

In the magnetic recording apparatus according to this embodiment, the magnetic head evacuates from the magnetic recording medium when the rotation speed of the magnetic recording medium does not reach the predetermined rotation speed.

What is claimed is:

1. A magnetic head comprising:
   a slider having a hole;
   a magnetic head core having a magnetic gap, said magnetic head core being arranged in said hole such that said magnetic gap is exposed to the outside of said slider; and
   a winding containing silver therein wound around said magnetic head core, wherein said winding is directly wound on said magnetic head core.

2. A magnetic head as claimed in claim 1, wherein a diameter of said winding is from 20 to 30 μm.

3. A magnetic head as claimed in claim 1, wherein said magnetic head core is formed of a single crystal of Mn—Zn ferrite.

4. A magnetic head as claimed in claim 1, wherein a high-saturated magnetic flux density material having a saturated magnetic flux density which is more than 1.3 T covers either of walls of said magnetic gap.

5. A magnetic head as claimed in claim 4, wherein said high-saturated magnetic flux density material comprises iron.

6. A magnetic head as claimed in claim 1, wherein the silver contained is from 1.5 to 2.5 wt %.

7. A magnetic head as claimed in claim 1, wherein said slider comprises ceramic including titanium calcium.

8. A magnetic head as claimed in claim 1, further comprising low melting point glass for adhering said magnetic head core to said slider.

9. A magnetic recording apparatus comprising:
   driving means for driving a magnetic recording medium;
   head assembly including first and second magnetic heads pinching said magnetic recording medium, wherein at least one of said magnetic heads comprises:
      a slider having a hole;
      a magnetic head core having a magnetic gap, said magnetic head core being arranged in said hole such that said magnetic gap is exposed to the outside of said slider; and
      a winding containing silver therein wound around said magnetic head core, wherein said winding is directly wound on said magnetic head core.

10. A magnetic recording apparatus as claimed in claim 9, wherein a diameter of said winding is from 20 to 30 μm.

11. A magnetic recording apparatus as claimed in claim 9, wherein said magnetic head core is formed of a single crystal of Mn—Zn ferrite.

12. A magnetic recording apparatus as claimed in claim 9, wherein a high-saturated magnetic flux density material of which saturated magnetic flux density is more than 1.3 T covers either of walls of said magnetic gap.

13. A magnetic recording apparatus as claimed in claim 12, wherein said high-saturated magnetic flux density material comprises iron.

14. A magnetic head as claimed in claim 9, wherein said slider comprising ceramic including titanic calcium.

15. A magnetic recording apparatus as claimed in claim 9, further comprising low melting point glass for adhering said magnetic head core to said slider.

16. A magnetic recording apparatus as claimed in claim 9, wherein said slider includes a plurality of air bearing surface trains arranged in the direction of driving said magnetic recording medium on a contact surface of said slider, each bearing surface train including protruding portions and a hollow portion between said protruding portions in the direction of driving said magnetic recording medium, said hollow portion escaping the air between said protruding portion and said recording medium.

17. A magnetic recording apparatus as claimed in claim 9, further comprising head shifting means for shifting said head assembly in a predetermined radial direction, wherein said magnetic heads evacuate from said magnetic recording medium with said head shifting means in a standby condition.

18. A magnetic head as claimed in claim 9, wherein the silver contained is from 1.5 to 2.5 wt %.

19. A method of producing a magnetic head comprising the steps of:
   providing first and second magnetic head cores having predetermined forms to provide a magnetic circuit with a magnetic gap therebetween when said first magnetic head core is connected to said second magnetic head core, one of the magnetic head cores being wound by a winding containing silver therein;
   sputtering a high-saturated magnetic flux density material on a surface of at least one of said first and second magnetic head cores which provides said magnetic gap; and
   connecting said first and second magnetic head cores.

20. A magnetic head as claimed in claim 19, wherein the silver contained is from 1.5 to 2.5 wt %.

* * * * *